March 9, 1926.

E. H. ARMSTRONG 1,576,022

APPARATUS FOR TREATING ACID PHOSPHATE

Original Filed August 6, 1921  2 Sheets-Sheet 1

Inventor
E. H. Armstrong

March 9, 1926.
E. H. ARMSTRONG
1,576,022
APPARATUS FOR TREATING ACID PHOSPHATE
Original Filed August 6, 1921    2 Sheets-Sheet 2
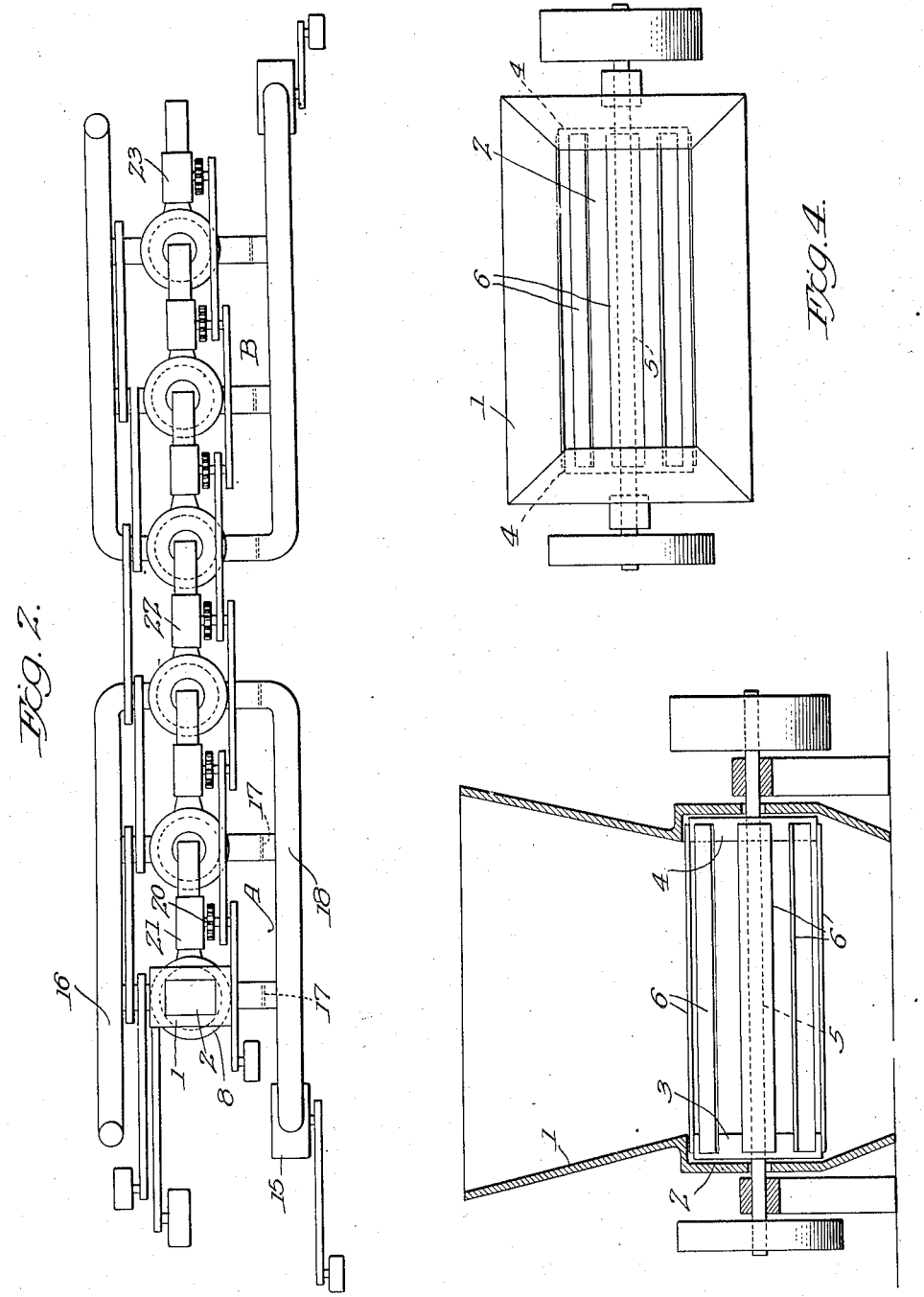
Inventor
E. H. Armstrong Patented Mar. 9, 1926.

1,576,022

UNITED STATES PATENT OFFICE.

ELI H. ARMSTRONG, OF SAVANNAH, GEORGIA.

APPARATUS FOR TREATING ACID PHOSPHATE.

Original application filed August 6, 1921, Serial No. 490,357. Divided and this application filed December 2, 1922. Serial No. 604,465.

*To all whom it may concern:*

Be it known that I, ELI H. ARMSTRONG, a citizen of the United States, residing at Savannah, in the county of Chatham and State of Georgia, have invented certain new and useful Improvements in Apparatus for Treating Acid Phosphate, of which the following is a specification, reference being had therein to the accompanying drawing.

This invention relates primarily to apparatus for treating acid phosphate and similar or analogous materials.

The present case is a true division of an application filed by me on August 6, 1921, Serial No. 490,357, and patented December 19, 1922, No. 1,439,054, and wherein is disclosed and claimed a novel method of treating acid phosphate, and in connection with which method the apparatus herein disclosed may be utilized.

The object of that method, as well as the apparatus herein claimed, is so to treat materials, such as a phosphatic mass, that the natural moisture-content, the insoluble phosphoric acid, and the free phosphoric acid will be materially reduced so that, as a consequence, the valuable phosphoric acid will be appreciably increased.

A further object of the invention, both of the method and of the disclosed apparatus, is so to treat the material that, when it shall have been "cured", it will be in a comparatively dry condition and be of high grade character, such that it may be immediately stored or shipped without appreciable chemical change in its condition.

A subsidiary object of the invention is to subject the phosphatic mass to the action of heated air and, as a subsequent step but part of the same operation, to the action of air of relatively different temperature, preferably unheated or cold air.

The invention has other objects and advantages which will be apparent from the following specification and claims.

In the accompanying drawings, I have shown one embodiment of apparatus for practicing the aforementioned method; but these drawings are merely illustrative, are so intended by this disclosure, and are obviously susceptible of a wide range of modification and variation without departing from the spirit of the invention or sacrificing any of the salient features or underlying principles thereof.

In these drawings:

Fig. 2 is a view in top plan thereof; and

Figs. 3 and 4 are views, respectively, in vertical section and in plan of a hopper and associated cutting mechanism for treating the material introduced into the apparatus and preparatory to passing therethrough.

Figure 1:
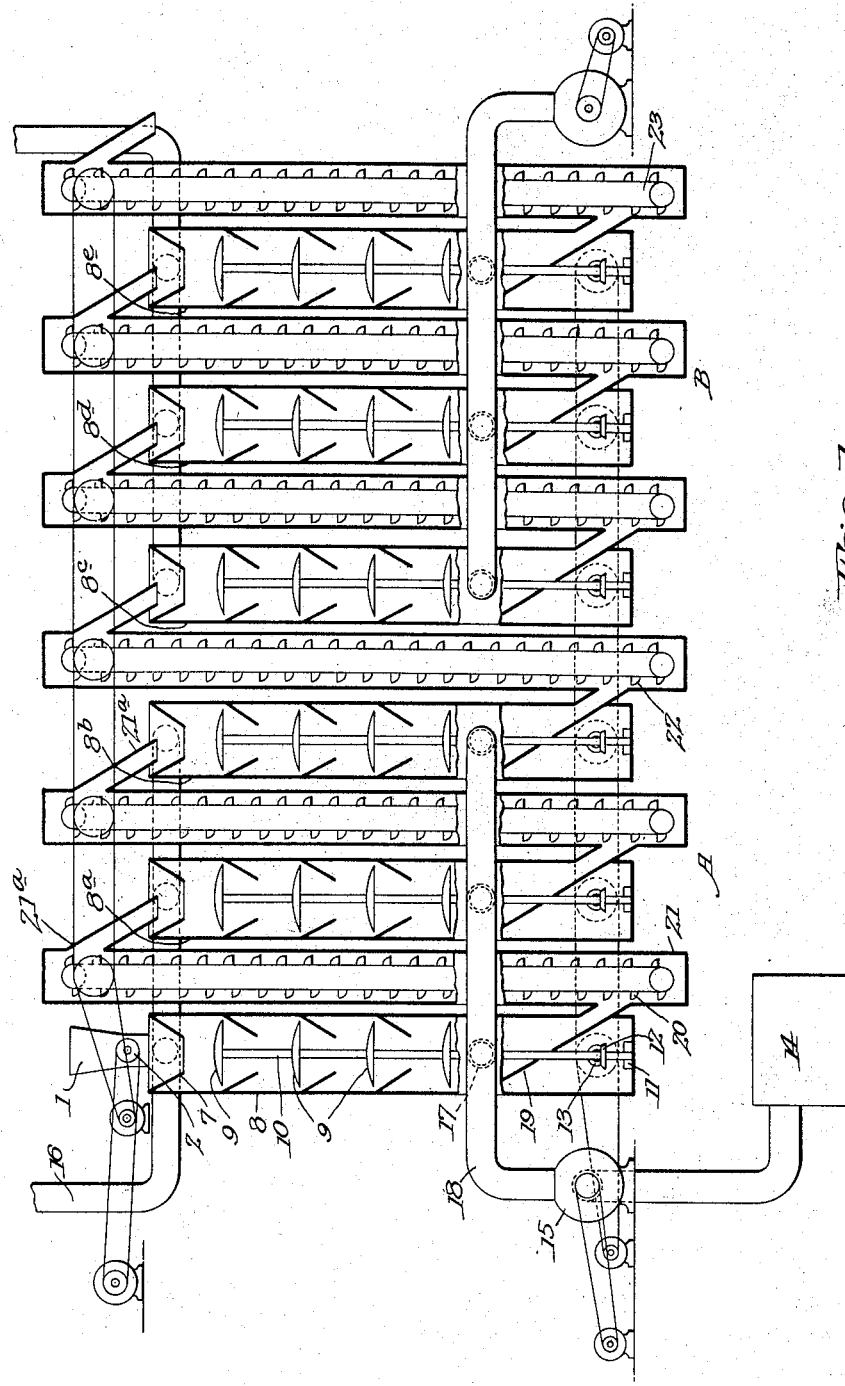
Figure 1 is a view in sectional elevation, more or less diagrammatic, of one form of apparatus constructed in accordance with my invention.

Referring to these drawings, the reference-character A designates a group of units constituting one component of the apparatus and designed for carrying out the first step of the aforementioned method; B designates another group of units and designed for carrying out the second step of the method; but it is to be understood that the operation, in practicing the method and in utilizing this apparatus, is a relatively continuous one inasmuch as there is no substantial interruption in the treatment of the material when passing from the units of Group A to those of Group B.

Constituting an instrumentality in Group A is a hopper 1 associated with a cutting or shaving machine 2, conveniently juxtaposed to the top of one of a series of vertically disposed conduits, towers, or columns hereinafter described in detail. The cutting machine preferably comprises metal disks 3 and 4 secured to a centrally disposed shaft 5. Attached to these disks 3 and 4 are knives 6 for cutting or shaving the phosphatic mass as the same passes through the machine, so that it will be reduced to dimensions to pass freely through the several towers of the series.

After the mass has thus been sufficiently reduced, it passes through a series of mass-directing or concentrating members 7, each of which, preferably and as shown, is cone or funnel shaped, the upper or entrance end of which is secured within the conduit or tower 8. Disposed beneath the members 7 is a series of revolving mass-spreading members, centrifugals, or revolving disks 9, each of which is preferably curved on its upper surface and is thus arc-shaped, so that material falling thereon will, by centrifugal action of the rotating disks, tend to move towards the edges thereof and against the walls of the tower. These disks are secured to a vertically disposed shaft 10 rotated at sufficient speed to develop the required centrifugal force to throw the phosphatic mass outwardly as it travels through the tower from one disk to those subjacent thereto. Preferably and as shown, these disks are of a diametrical dimension somewhat smaller than the cone-shaped member 7, so that the mass may drop by gravity from the reduced ends of the members onto the subjacent disks at about their central portion.

Preferably and as shown, means are provided for supporting and driving the shaft 10, such means, in this instance, including bearings 11, a pinion 12, and a gear 13. It is to be understood that the speed of rotation of the shaft and disks carried thereby may be regulated in any well known manner, so that the material falling onto the disks will be effectually thrown by centrifugal action against the side of the tower and thence by gravity dropped to the subjacent cone-shaped member. By means of the centrifugals 9, the phosphatic mass is centrifuged and thus more or less separated for efficient action of an air treatment presently to be described.

Preferably and as shown, the apparatus includes a plurality of towers of the same general construction as the tower 8. Any required number of these may be utilized, according to the capacity required; but, in the present instance, only six are shown, numbered 8, $8^a$, $8^b$, $8^c$, $8^d$ and $8^e$, and each of which is provided with a set or series of the cone-shaped members and centrifugals, it being understood that the number of towers may be increased or diminished, as desired.

In order that the phosphatic mass may be subjected to the action of a drying medium while passing through the apparatus and from tower to tower, I have provided means for subjecting material to the influence of a current or blast of air, preferably heated to a predetermined degree by a furnace 14. The furnace is preferably located at one side of the apparatus, and heated air is forced by fans or blowers 13, located adjacent the furnace, so that such air may enter the towers adjacent their lowermost portion and pass in an upward direction and through the downwardly traveling mass and thence escape through a flue 16 opening into the atmosphere or leading into a room or chamber (not shown) that will operate as a dust-collector. By thus subjecting the downwardly traveling mass to the action of a current of heated air, there is such a thorough intermingling of the air with the material that, in actual practice, I have been able to reduce the natural moisture content of the mass from approximately 14% to 8% and less, and to reduce the insoluble phosphoric acid from approximately ½% to 1%, with a consequent reduction in the free phosphoric acid from between 3% to 5%, and with an increase in the available phosphoric acid of from 1½% to 2%.

Any desired means may be provided for regulating the volume of air entering the towers, and such means may include dampers 17 disposed in a pipe 18 leading from the blower 15.

Adjacent the lower end of each tower is, preferably and as shown, an inclined chute 19 adapted to direct the moving mass of material into the path of travel of an elevator or conveyor 20 operating in a housing 21 and by which conveyor the mass is raised and then directed through a conduit or channel $21^a$ which communicates with the adjacent tower.

Thus, it will be seen that the material, after being introduced through the hopper 1 into the tower 8 and therein treated in the manner described, is elevated so that it may be introduced into the upper portion of the tower $8^a$, wherein it is similarly treated; after which it is passed into the tower $8^b$, wherein it is similarly treated. From tower $8^b$ the mass is directed to an elevator or conveyor 22 which lifts the mass so that it may be introduced successively into towers $8^c$, $8^d$ and $8^e$, wherein it is subjected to the action of an upwardly traveling current of air of relatively different temperature from that utilized in towers $8^a$ and $8^b$ and $8^c$, and which air is preferably unheated or cold; that is, of a temperature that will arrest and prevent further chemical action or reaction after the acid phosphate has been "cured" and delivered.

After being discharged from the tower $8^e$, the mass is delivered to an elevator 23, by which it is carried to a suitable screening machine (not shown) and then discharged from the apparatus.

While my invention is particularly adapted for the treatment of phosphatic materials; nevertheless, it is to be understood that the apparatus herein revealed may be utilized for the treatment of any other appropriate mass or material where it is desired to subject the same to a centrifuging action and also to the action of bodies of air of relatively different temperature.

By the apparatus herein disclosed, the phosphatic mass may be handled effectually through successive stages, beginning with an altitudinous position and, while passing therefrom, be subjected to the action of a countercurrent of air, heated or unheated, as required.

What I claim is:

1. Apparatus for treating phosphates and the like, comprising a tower, including a casing, a series of cone-shaped mass-directing members in spaced relation within the casing, a rotatable support for spreading members mounted within the casing, a spreader member having a convex upper surface mounted on the support in proximity to certain of the cone-shaped mass-directing members, means for rotating the support operatively associated with certain of the members, and regulable means for directing a blast of heated air through the casing and against the materials passing therethrough.

2. Apparatus for treating phosphates and the like comprising a tower including a casing, a series of cone-shaped mass-directing members in spaced relation within the casing, a rotatable support for spreading members mounted within the casing, a spreader member having a convex upper surface mounted on the support in proximity to certain of the cone-shaped mass-directing members, means for rotating the support operatively associated with certain of the members, regulable means for directing a blast of heated air through the casing and against the materials passing therethrough, mechanism for feeding material to the tower including a hopper, and material-disintegrating mechanism operatively associated with the hopper.

3. Apparatus for treating phosphates and the like, comprising a tower including a casing, a series of cone-shaped mass-directing members in spaced relation within the casing, a rotatable support for spreading members mounted within the casing, a spreader member having a convex upper surface mounted on the support in proximity to certain of the cone-shaped mass-directing members, means for rotating the support operatively associated with certain of the members, regulable means for directing a blast of heated air through the casing and against the materials passing therethrough, mechanism for feeding material to the tower including a hopper, material-disintegrating mechanism operatively mounted within the hopper, and means for directing the materials from the casing comprising a deflector member disposed in the path of travel of the materials and directing them through an opening provided in the casing.

4. Apparatus for treating phosphates and the like comprising a series of towers each including a casing, a series of cone-shaped mass-directing members disposed in spaced relation within each casing, a rotatable support for spreading members mounted within each casing, a spreader member having a convex upper surface mounted on the support in proximity to certain of the cone-shaped mass-directing members, means for rotating the support operatively associated with certain of the members, and regulable means for directing a blast of heated air through certain of the casings and against the materials passing therethrough.

5. Apparatus for treating phosphates and the like comprising a series of towers each including a casing, a series of cone-shaped mass-directing members disposed in spaced relation within each casing, a rotatable support for spreading members mounted within each casing, an imperforate spreader member mounted on the support in proximity to certain of the cone-shaped mass-directing members, means for rotating the support operatively associated with certain of the members, regulable means for directing a blast of heated air through certain of the casings and against the materials passing therethrough, conveying mechanism for carrying materials from one tower to another comprising a housing disposed in proximity to one of the towers and communicating therewith through an opening provided in the housing, a conveyor disposed in the housing, and a chute associated with the housing for directing materials to the next tower of the series.

6. Apparatus for treating phosphates and the like comprising a series of towers each including a casing, a series of cone-shaped mass-directing members disposed in spaced relation within each casing, a rotatable support for spreading members mounted within each casing, a spreader member mounted on the support in proximity to certain of the cone-shaped mass-directing members having a convex upper surface, means for rotating the support operatively associated with certain of the members, regulable means for directing a blast of heated air through certain of the casings and against the materials passing therethrough, conveying mechanism for carrying materials from one tower to another comprising a housing disposed in proximity to one of the towers and communicating therewith through an opening provided in the housing, a conveyor disposed in the housing, a chute associated with the housing for directing materials to the next tower of the series, and mechanism for subjecting the materials to a blast of cool air comprising a blower and a conduit associated therewith and directing air to certain of the towers.

In testimony whereof I affix my signature.

ELI H. ARMSTRONG.